United States Patent [19]

Owen et al.

[11] 4,065,787
[45] Dec. 27, 1977

[54] TIME BASE CORRECTOR

[75] Inventors: David Peter Owen, Newbury; Barry Donald Ruberry Miles, Thatcham, both of England

[73] Assignee: Quantel Limited, England

[21] Appl. No.: 760,197

[22] Filed: Jan. 17, 1977

[30] Foreign Application Priority Data

Jan. 28, 1976 United Kingdom ............... 3207/76

[51] Int. Cl.² ............................................. H04N 5/79
[52] U.S. Cl. ................................. 358/160; 358/127; 360/36
[58] Field of Search ................... 358/8, 127, 160; 360/36

[56] References Cited

U.S. PATENT DOCUMENTS 3,994,013  11/1976  Lemoine ............................ 358/8
3,996,605  12/1976  Coffey ............................... 358/8

Primary Examiner—Howard W. Britton
Attorney, Agent, or Firm—Dowell & Dowell

[57] ABSTRACT

A video time base corrector includes an analogue-to-digital converter for converting an incoming analogue video signal to digital form, and a store for receiving successive lines of video information in digital form from the converter. A digital-to-analogue converter converts the digital output signal from the store into analogue form.

Control means are provided for writing-in and reading out the digital information into and from the store. A triggered voltage controlled input oscillator determines the rate of conversion of the analogue signal to digital form and the rate of writing into the store. An output oscillator controls the rate of reading out of the digital information from the store and the rate of conversion into analogue form.

Sampling means sample the input oscillator controlling voltage during one line and measuring means detect any voltage difference in the controlling voltage during successive lines.

Holding means retain the detected voltage difference between successive lines and this is applied to phase shifter means for shifting the phase of the output oscillator in dependance on the voltage difference held by the holding means.

10 Claims, 5 Drawing Figures

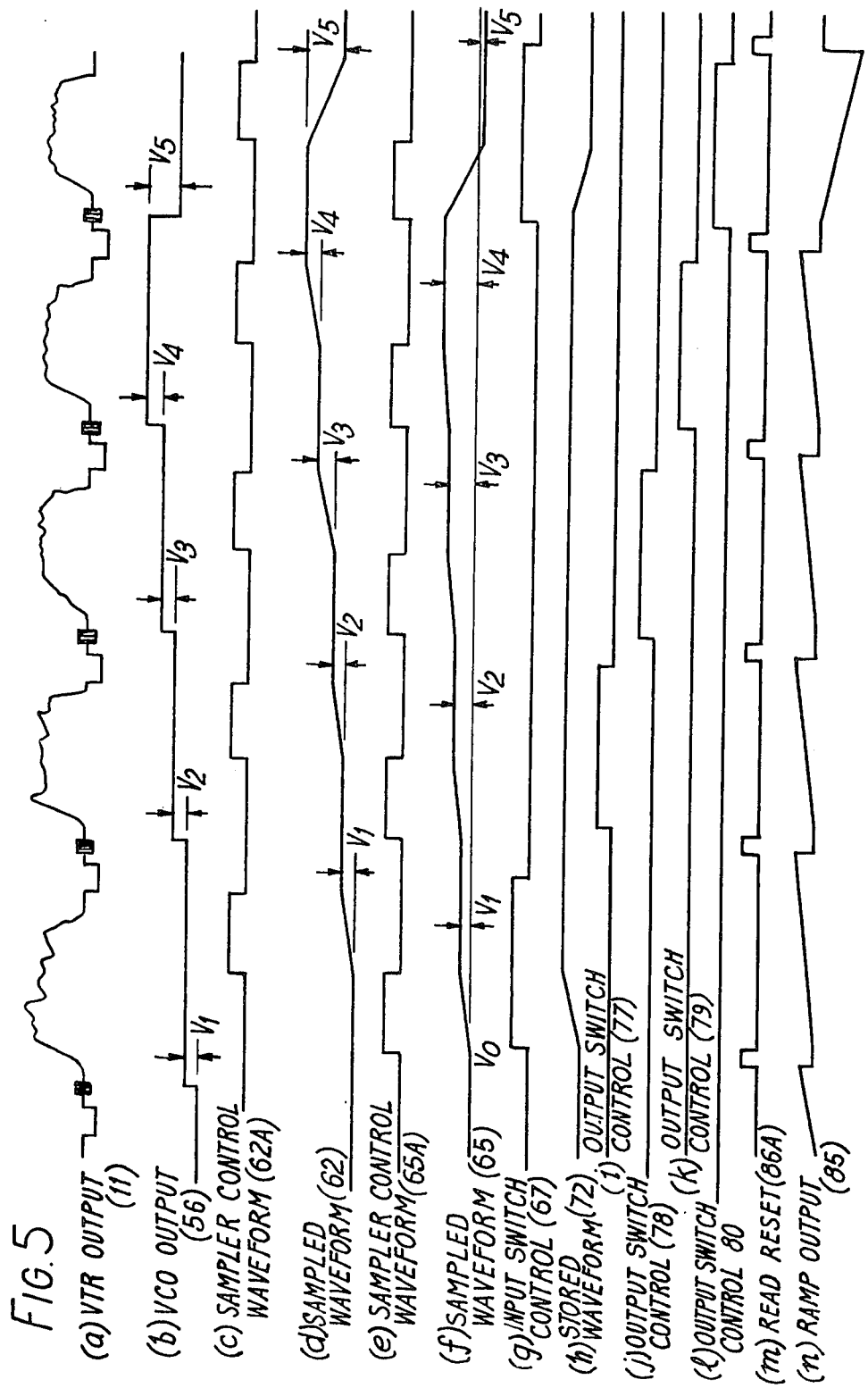

TIME BASE CORRECTOR

BACKGROUND TO THE INVENTION

This invention relates to digital time base correctors and more particularly to velocity compensation in time base correctors.

Time base correctors are used for example with video tape recorders (VTR) to correct errors in timing of the signal produced at the output of the VTR with reference to a stable synchronizing signal. These errors arise because of changes in the velocity of the tape transport and the scanning mechanism of the VTR.

Time base correctors may also include a compensator for reinserting information lost on the tape due to oxide dropout (see for example British Patent No. 1,436,757 and U.s. Pat. No. 3,949,416).

In known time base correctors, the incoming video signal from the VTR is converted into a digital format by an analogue-to-digital converter (ADC). The digital output from the ADC is stored in a store which will conveniently have a capacity sufficient to store one or more complete television lines. The output from the store is converted into an analogue video signal by a digital-to-analogue converter (DAC).

The incoming video signal is converted into digital format at a clock rate determined by the input oscillator. The input oscillator frequency is caused to follow the timing perturbations of the output signal of the VTR.

The information read from the store into the DAC is under the control of an output oscillator which is generally locked to a local synchronizing signal and therefore is at a fixed frequency.

The principle of the operation is that information is written into the store at a speed which depends upon the perturbations on the output from the VTR but that the information is read out of the store at a constant rate. Thus, the equipment eliminates time perturbations occurring on the video signal.

In one known configuration, the input oscillator designed to track the information coming from the VTR takes the form of a phase locked loop (PLL). In such a system a voltage controlled oscillator (VCO) running at a suitable sampling frequency produces an output which is used to drive the ADC. The output is also applied to a system of multipliers and dividers which reduces the frequency to precisely that of the television line frequency. The output of the system is applied to one input of a phase discriminator which has its other input coming from the separated line synchronizing pulse from the VTR.

The phase discriminator produces a variable voltage at its output which is arranged to control the frequency of the voltage controlled oscillator in a manner which will cause the phase error at the two inputs to the discriminator to be close to zero.

However, with such a system the instantaneous frequency of the VCO is a function of the output of the phase discriminator over several preceding lines. Therefore, when a phase error between the off-tape signal and the VCO occurs, there is a finite response time before the error can be reduced to zero. For some types of off-tape timing perturbations it is impossible to design a phase locked loop which satisfactorily tracks the off-tape signal (that is to a close enough timing accuracy).

In the corrector disclosed in our co-pending cognate British Patent Applications 11793/74 and 11794/74 (U.S. Pat. Nos. 3,971,063 and 3,978,519), more accurate compensation of the timing errors is achieved by providing a triggered oscillator which is triggered in response to the incoming sync pulse alone or colour burst and sync pulse signals. However, as the frequency error is corrected on the next incoming line the error correction is always one line late.

OBJECT OF THE INVENTION

The object of the present invention is to provide a digital time base corrector which corrects frequency error within the same television line.

SUMMARY OF THE INVENTION

According to the invention there is provided a video time base corrector comprising an analogue-to-digital converter for converting an incoming analogue video signal to digital form; a store for receiving successive lines of video information in digital form from said converter; a digital-to-analogue converter for converting a digital output signal from said store into analogue form; control means for writing-in and reading-out the digital information into and from said store; a triggered voltage controlled input oscillator for determining the rate of conversion of said analogue signal to digital form and the rate of writing into said store; an output oscillator for controlling the rate of reading out of the digital information from said store and the rate of conversion into analogue form; sampling means for sampling the input oscillator controlling voltage during one line; measuring means for detecting any voltage difference in the controlling voltage during successive lines; holding means for retaining the detected voltage difference between successive lines; and phase shifter means for shifting the phase of the output oscillator in dependance on the voltage difference held by said holding means.

Further according to the invention there is provided a method of compensating for velocity errors in a video time base corrector including an analogue-to-digital converter, a digital store, a digital-to-analogue converter, a triggered voltage controlled input oscillator and an output oscillator, said method comprising detecting the input oscillator controlling voltage during one line, measuring the difference between the voltage detected during successive lines; retaining the voltage difference measured for at least one line; and phase shifting the output oscillator in dependance on the voltage difference to provide compensation for velocity errors at the output from the store.

BRIEF DESCRIPTION OF THE DRAWINGS

The invention will now be described by way of example with reference to the accompanying drawings, in which:

FIg. 5 shows waveforms relating to the corrector of FIG. 4.

DESCRIPTION OF PREFERRED EMBODIMENT

Figure 1:
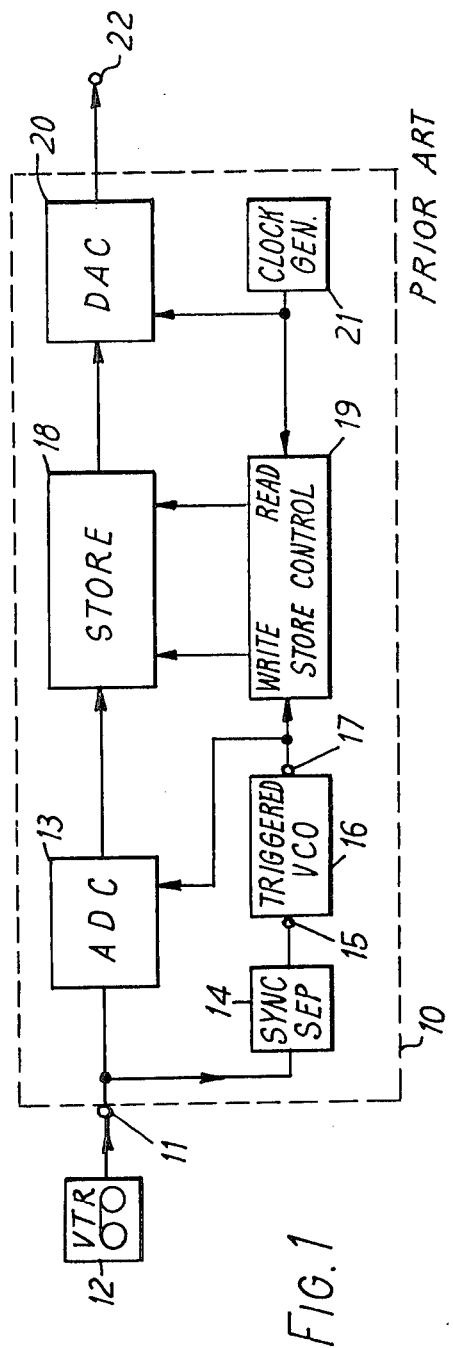
FIG. 1 shows a block diagram of an embodiment of the video time base corrector disclosed in our cognate British Patent Applications 11793/74 and 11794/74 (U.S. Pat. Nos. 3,971,063 and 3,978,519)

The digital time base corrector 10 of FIG. 1 (disclosed in greater detail in the above mentioned British and U.S. Patent applications comprises an input 11 connected both to an analogue-to-digital converter 13 and to a sync separator 14. The digital output from converter 13 (in parallel form) is connected to a store 18 which has its output connected to a digital-to-analogue converter 20. The output from sync separator 14 is fed to input 15 of a triggered oscillator 16, the output 17 of which is used to provide clocking of the write-in facility of store control 19 together with clocking of ADC 13. The read-out facility of store control 19 is clocked by means of clock generator 21 which also provided clocking for DAC 20. The time base corrector is provided with an output terminal 22. Input terminal 11 is shown connected to a video tape recorder 12.

Figure 2:
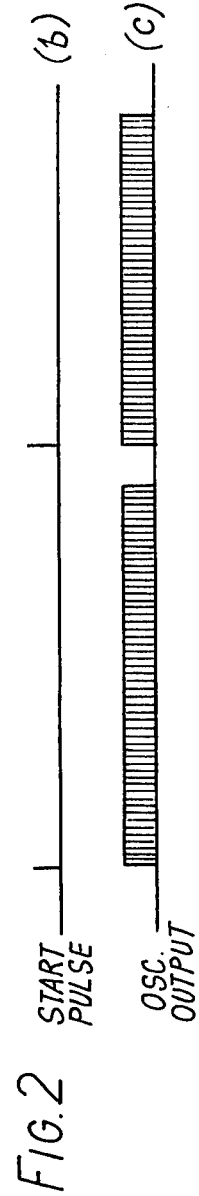
FIG. 2 shows waveforms relating to the operation of the corrector of FIG. 1.

From FIG. 2 it is seen that the incoming video signal (Waveform (a)) includes a sync pulse 30 and colour burst information 31. The sync separator 14 produces an output pulse (b). This output pulse from separator 14 is initiated by the leading edge of the received sync pulse and the start pulse triggers oscillator 16 to produce a burst of pulses (c). The length of the pulse train is sufficient to cause all the video information in one active line period to be converted by the ADC and stored before the oscillator output ceases awaiting arrival of the next start pulse from separator 14.

Typically the line length is approximately 64 $\mu$s, and the frequency of oscillators 16 and 21 is about three times (colour burst) sub-carrier frequency.

Figure 3:
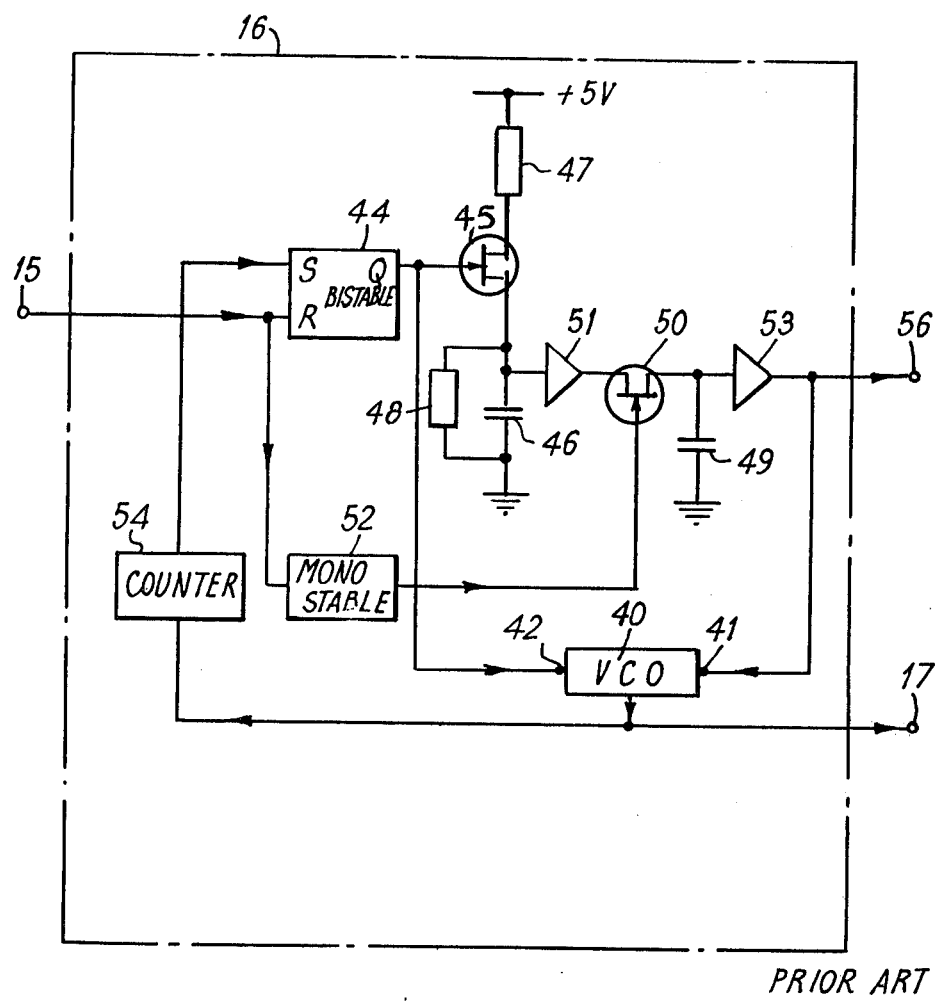
FIG. 3 shows in more detail the triggered oscillator of FIG. 1.

The input oscillator is shown in greater detail in FIG. 3. The oscillator effects an alteration of its frequency on a line to line basis.

In this arrangement the length of each line produced by the VTR is measured and the result is used to adjust the oscillator frequency for the next line so that it is closer to the desired frequency.

Although the beginning of the line is precisely timed and thus the colour rendition at the beginning of a line is accurate, the circuit of FIG. 3 also allows the colour rendition at the end of the line to be more accurately maintained.

Although the oscillator start pulse in this instance is derived from the leading edge of the synchronizing pulse, it is also possible as described in the British and U.S. Patent applications above for the sync pulse information to be combined with information contained in the color sub-carrier burst to improve the timing stability of the oscillator start point. The time is compared between the moment at which the oscillator stopped and the moment at which the next start pulse is derived. The resultant information is used to control the oscillator frequency so that the time variance is minimised. The oscillator stop point is determined by a counter which counts a predetermined number of oscillator pulses and then stops the input oscillator.

The triggered oscillator block 16 comprises a triggered voltage controlled oscillator 40 which is a stable LC oscillator but in which the frequency may be adjusted slightly by the application of a variable voltage at a voltage control input terminal 41. The triggered oscillator 40 starts upon receiving a logical low level at its stop-start control terminal 42 and stops upon receiving a logical high level at its stop-start control terminal 42.

The pulses received at input 15 derived from the sync pulse separator are used to control a line length bistable 44 which also produces the stop-start waveform for the triggered voltage controlled oscillator 40.

The output from the line length bistable 44 produces a pulse which is also used to control a switch (FET) 45 to switch a current into a capacitor 46 for the period between stopping and restarting the oscillator for a new line. The current derived from a +5v rail and a resistor 47 flows into the capacitor 46 charging it to a voltage which is dependant upon the width of the pulse driving the switch 45.

A resistor 48 is arranged to discharge capacitor 46 during the length of each line, said capacitor being charged from zero to a voltage which represents the difference between the stop and start time during the interval between stopping and starting the oscillator.

An analogue sampling circuit including a switch (FET) 50, connected to the capacitor 46 by a buffer amplifier 51, and a monostable 52, is arranged to sample the peak of the voltage on capacitor 46 and store in a capacitor 49 so that the resultant output from the buffer amplifier 53 is a steady voltage for the length of one line and used to drive the voltage control input terminal 41 of the triggered VCO 40. The sampling pulse driving the sampling switch is derived from the oscillator start pulse. In a typical practical circuit, the sampling pulse generator monostable 52 will have a pulse width of approximately 1$\mu$ sec following the oscillator start pulse. This 1$\mu$ sec pulse will close the sampling switch just as the capacitor 46 reaches its peak voltage and will charge capacitor 49 to that peak voltage. At the end of the 1$\mu$ sec period the sampling switch will open leaving the charge stored on capacitor 49 which is available as a buffered signal to control the oscillator. A counter 54 is connected between the output of the VCO 40 and the set input of the bistable 44 for providing the stop pulse after the correct count has been made. The moment of occurrence of the stop pulse is dependant on the number of counted pulses, the time period of this block of pulses being variable in dependance upon the oscillator frequency. While the oscillation frequency may vary from line to line, the number of pulses will, of course, remain constant for each line as determined by the counter. Thus, the length of the train of sampling clock pulses is varied in sympathy with the off-tape line period by changing the frequency of the clock pulses from line to line. The oscillator pulses are made available at output 17. The voltage from amplifier 53 is made available at output 56.

Figure 4:
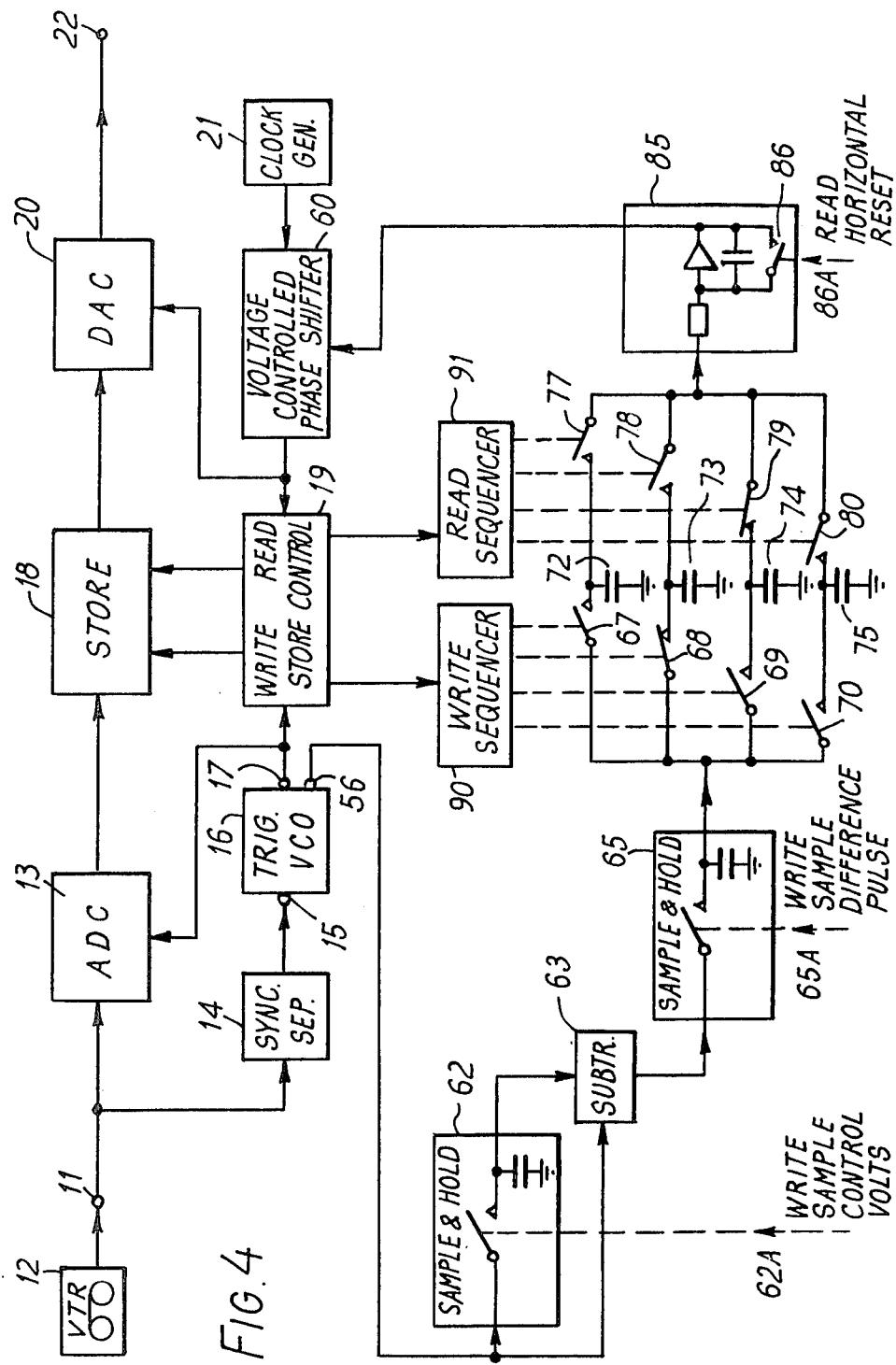
FIG. 4 shows a block diagram of an embodiment of the corrector according to the present invention.

The converter of FIG. 4 differs from that of FIG. 1 in that the output of the clock generator 21 is connected via a voltage controlled phase shifter 60 to the store control 19 and DAC 20 instead of being connected to these directly.

The voltage for controlling the phase shifter 60 is derived from an additional circuit arrangement (to be described below) which is under the influence of the voltage produced at output 56 of the VCO 16.

This additional circuit arrangement includes a sample and hold circuit 62 which receives the frequency control voltage from output 56 of VCO 16. The voltage from output 56 is also applied to a subtractor 63 which measures the difference between the voltage from VCO 16 (say at line n) and that at the sample output of hold circuit (line n−1). The voltage error measured by the subtractor 63 (at the start of line n) is applied to a further sample and hold circuit 65 which samples and holds this error voltage (during line n). The output from hold circuit 65 is applied to several storage paths (in this example four, which is dependant on the line storage capacity of digital store 18). Each path is provided with an input switch 67, 68, 69 or 70, a storage capacitor 72, 73, 74 or 75 respectively, and an output switch 77, 78, 79 or 80 respectively. Input switches 67–70 are controlled by write sequencer 90. Output switches 77–80 are controlled by read sequencer 91. Write sequencer 90 ensures that the voltage applied to a particular capacitor corresponds to the same line being written into the store 18. Read sequencer 91 ensures that the correct capacitor is connected to the output corresponding to the line being read out from the store. The voltage from the connected capacitor 72, 73, 74 or 75 is applied to ramp generator (integrator) 85 which includes a reset switch 86 to ensure that the ramp generated starts from a fixed reference point. With the exception of the reset switch 86, the ramp generator may be of known construction (i.e. an operational amplifier with associated resistor and capacitor as shown in FIG. 4). The voltage produced by generator 85 is applied to the voltage controlled phase shifter 60, to phase shift the signal from clock generator 21 in dependance on this voltage level. Voltage controlled phase shifters are well known in the art (e.g. a monostable circuit receiving the ramped voltage) and is therefore not described in detail. Since any line of video is stored for at least one line time in the store then by using the circuit arrangement of FIG. 4 it is possible to compensate for VTR timing errors not only at the input to the store 18 but also at the output therefrom by changing the phase of the oscillations received from output clocking generator 21 to compensate for errors measured for that line by subtractor 63.

The write and read sequencers 90, 91 can be constructed using similar techniques to those used to provide the known store control 19 effecting sequencing of the line stores (in store 18). Thus four stage ring counters could be used to sequence in turn the switches 67–70 and 77–80 for the capacitors 72–75. Although the switches are shown as mechanical switches in practice these would be constructed from well known solid state components (e.g. FETs).

The waveforms for the arrangement of FIG. 4 are shown in FIG. 5.

The output voltage from the VCO is sampled and then passed through the subtractor 63 where the difference is measured in relation to the next voltage level from the VCO, and after further sampling is stored for further use in (say) capacitor 72. Thus each of the capacitors 72–75 will be used to store the output from sampler 65 every fourth line and this level is passed to ramp generator 85 at the appropriate time to correct for error via the phase shifter 60 as described above. The write sample control waveform 62A may for example be derived from the counter 54 in the VCO 16. The write sample difference pulse 65A may also be derived from the counter but is staggered relative to 62A as shown in FIG. 5. Read reset pulses 86A may be derived from the output of the clock generator 21.

We claim:

1. A video time base corrector comprising:
    a. an analogue-to-digital converter for converting an incoming analogue video signal to digital form;
    b. a store for receiving successive lines of video information in digital form from said converter;
    c. a digital-to-analogue converter for converting a digital output signal from said store into analogue form;
    d. control means for writing-in and reading-out the digital information into and from said store;
    e. a triggered voltage controlled input oscillator for determining the rate of conversion of said analogue signal to digital form and the rate of writing into said store;
    f. an output oscillator for controlling the rate of reading out of the digital information from said store and the rate of conversion into analogue form;
    g. sampling means for sampling the input oscillator controlling voltage during one line;
    h. measuring means for detecting any voltage difference in the controlling voltage during successive lines;
    i. holding means for retaining the detected voltage difference between successive lines; and
    j. phase shifter means for shifting the phase of the output oscillator in dependance on the voltage difference held by said holding means.

2. A video time base corrector according to claim 1, wherein said sampling means comprises a sample and hold circuit for holding the sampled control voltage from said input oscillator during one line.

3. A video time base corrector according to claim 1, wherein said measuring means comprises a subtractor having a first input connected to receive the control voltage from said input oscillator and a second input for receiving the hold control voltage from said sampling means for the preceding line to provide a voltage output corresponding to the difference in the voltages between successive lines.

4. A video time base corrector according to claim 1, wherein said holding means comprises a sample and hold circuit for retaining the detected voltage difference during one line; a plurality of analogue storage elements on separate paths, the number of elements corresponding to the number of lines of digital storage of said store; input switching means for sequentially switching said storage elements to successively retain the voltage difference held in the sample and hold circuit for a number of time periods corresponding to the number of lines of digital storage in said store; and output switching means for sequentially switching the voltages held on said analogue storage elements to said phase shifter means to effect control of said output oscillator when the corresponding line is being read from said store.

5. A video time base corrector according to claim 4, wherein said input and output switching means comprise a plurality of switch elements one on each storage element path and sequencing means for sequentially switching the input and output switches to apply the voltage for one line to one storage element which corresponds to the same line being written into said store and to connect this stored voltage to the phase shifter corresponding to the line being read from said store.

6. A video time base corrector according to claim 5, wherein said sequencing means is driven by said control means for the store.

7. A video time base corrector according to claim 1, wherein the voltage from said holding means is applied to said phase shifter means via a ramp generator.

8. A method of compensating for velocity errors in a video time base corrector including an analogue-to-digital converter, a digital store, a digital-to-analogue converter, a triggered voltage controlled input oscillator and an output oscillator, said method comprising:

a. detecting the input oscillator controlling voltage during one line;
b. measuring the difference between the voltage detected during successive lines;
c. retaining the voltage difference measured for at least one line; and
d. phase shifting the output oscillator in dependance on the voltage difference to provide compensation for velocity errors at the output from the store.

9. The method according to claim 8, wherein the difference voltages for several lines are retained in dependance on the number of lines of storage in the store.

10. The method according to claim 8, wherein the difference voltage is integrated to provide phase shifting of the output oscillator.

* * * * *